US006254976B1

(12) United States Patent
Ono

(10) Patent No.: US 6,254,976 B1
(45) Date of Patent: Jul. 3, 2001

(54) ELECTROPHOTOGRAPHIC CHARGING MEMBER

(75) Inventor: Masato Ono, Minami Ashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 08/325,566

(22) Filed: Oct. 19, 1994

(30) Foreign Application Priority Data

Dec. 28, 1993 (JP) .................................................. 5-349397

(51) Int. Cl.[7] .............................. B32B 3/26; G03G 15/00

(52) U.S. Cl. .................................... 428/304.4; 428/307.3; 428/318.4; 428/319.3; 428/323; 428/472.2; 492/53; 492/58; 399/176; 361/225; 361/230; 430/902

(58) Field of Search .............................. 428/304.4, 307.3, 428/312.8, 318.4, 319.1, 319.3, 323, 469, 472.2, 702; 492/53, 54, 58; 355/219; 361/221, 225, 230; 399/176; 430/902

(56) References Cited

U.S. PATENT DOCUMENTS 4,408,004 * 10/1983 Pengilly .
4,410,259 * 10/1983 Yamagata et al. .................... 355/259
4,430,410 * 2/1984 Aizawa et al. ........................ 430/122
4,476,272 * 10/1984 Pengilly .
4,535,118 * 8/1985 Pengilly .
4,862,799 * 9/1989 Hycner et al. ....................... 101/348
5,166,020 * 11/1992 Fukuda et al. .......................... 430/58
5,397,666 * 3/1995 Fukuda et al. .......................... 430/58
5,782,968 * 7/1998 Hirayama et al. .

FOREIGN PATENT DOCUMENTS 50-543 1/1975 (JP) .
63-149668 6/1988 (JP) .
63-208877 8/1988 (JP) .
64-73365 3/1989 (JP) .
1-179958 7/1989 (JP) .
2-199163 8/1990 (JP) .

OTHER PUBLICATIONS

Kirk– Othmer Encyclopedia of Chemical Technology, 3rd ed., vol. 4, John Wiley & Sons, Inc., 1978, pp. 631–666.*

* cited by examiner

*Primary Examiner*—Marie Yamnitzky
(74) *Attorney, Agent, or Firm*—Oliff & Berridge, PLC

(57) ABSTRACT

A charging member for amorphous silicon photoreceptors which can be supplied with a uniform and stable resistivity, exhibits an excellent durability and is insusceptible to variation of resistivity against environmental conditions, pinhole leak and contamination on the photoreceptors, showing a good quality and a long life. An electrophotographic charging member for charging a photoreceptor (preferably, mainly composed of amorphous silicon), which comprises a porous anodized aluminum film formed by anodically oxidizing a support the surface of which is made of aluminum or aluminum alloy. In the charging member, it is preferred that the pores in the porous anodized aluminum film be filled with a metal or an electrically conductive material made of an oxyacid salt of transition metal or pure water be attached to the inner wall of the pores in the porous anodized aluminum film. The charging member of the present invention may comprise a surface protective layer on the porous anodized aluminum film. The surface protective layer preferably is made of an organic high molecular compound or inorganic high molecular compound having electrically conductive fine particles dispersed therein. Alternatively, the surface protective layer may comprise an abrasive dispersed therein.

13 Claims, 2 Drawing Sheets

ELECTROPHOTOGRAPHIC CHARGING MEMBER

FIELD OF THE INVENTION

The present invention relates to a charging member for electrophotographic apparatus.

BACKGROUND OF THE INVENTION

An electrically conductive member to be incorporated in a charging member for charging an electrophotographic photoreceptor is required to exhibit electrical conductivity of $10^3$ to $10^9$ Ω as calculated in terms of resistivity (hereinafter determined by means of an electrode having an area of 1 $cm^2$). In general, it is provided on a metallic shaft and its external surface as an electrically conductive layer such as electrically conductive rubber layer. In order to make the electrically conductive member fully functional as a charging member, it is considered preferred that its resistivity level be in the range of $10^3$ to $10^9$ Ω as defined above. If there occurs a locally low electrical conductivity, it causes a phenomenon of passage of excess current through defective portions on the photoreceptor, i.e., so-called pinhole leak, resulting in image defects. Therefore, in order to inhibit pinhole leak, the lower limit of the resistivity of the electrically conductive rubber layer is preferably in the range of $10^6$ to $10^9$ Ω. However, if the resistivity of the electrically conductive rubber layer exceeds $10^9$ Ω, no discharge occurs. Thus, the charged potential of the photoreceptor is not sufficient, causing the image to be entirely fogged (i.e., ghost).

In order to eliminate this defect, a function separation structure in which the resistivity of the electrically conductive rubber layer is kept low and a resin having a high resistivity is provided on the surface of the rubber layer as a resistive layer has been employed (JP-A-1-79958 (The term "JP-A" as used herein means an "unexamined published Japanese patent application")). However, this structure is disadvantageous in that different environmental conditions give different resistivities and hence different image densities. Another inevitable problem is that as the photoreceptor is repeatedly charged, the resin layer is unevenly worn, causing uneven discharging, or discharge products or part of toner constituent materials is attached to the surface of the resin layer, causing image defects. Further, the resin or rubber is worn while being brought into contact with the photoreceptor, producing rubber tailings that can be transferred to images.

The foregoing electrically conductive rubber layer is normally made of an electrically conductive rubber composition comprising a synthetic rubber such as EPDM rubber or silicone rubber with a powder of an electrically conductive material or electrically conductive fiber (carbon black, metallic powder, carbon fiber, etc.) incorporated therein. In order to allow the electrically conductive rubber layer to have an electrical conductivity as $10^3$ to $10^9$ Ω, it is necessary that the powder of an electrically conductive material or electrically conductive fiber be uniformly dispersed within the plane. However, reproducibility and mass producibility problems such as resistivity variation within the plane and from lot to lot make it difficult to obtain sufficient properties.

In order to eliminate these difficulties, a charging roll has been proposed which is provided with an ionically conductive rubber layer that makes the use of the inherent ionic conductivity of synthetic rubber or an ionically conductive rubber layer obtained by adding a high dielectricity liquid or ionic substance to a synthetic rubber so that its ionic conductivity is increased (JP-A-2-199163). In this case, the ionically conductive rubber layer is a uniform dispersion system and thus can provide a uniform resistivity. However, it is disadvantageous in that when charging is repeated with a charging roll having the ionically conductive rubber layer being brought into direct contact with the surface of the photoreceptor, low molecular components contained in the rubber layer are transferred to the photoreceptor, causing image defects.

The charging roll is rotated while being pressed against the external surface of the exposing drum so that discharging occurs in the vicinity of the contact to charge the external surface of the exposing drum. Thus, the charging roll is required to be rigid enough to give no stress to the photoreptor. Thus, it is desired to replace the electrically conductive rubber layer by a rigid material such as semiconducting material. In this respect, a ceramic roller having a semiconducting substance free of elastic material is disclosed (JP-A-50-843). However, this ceramic roller can easily cause uneven discharging and thus cannot provide stable charging. This ceramic roller is also disadvantageous in that when it is rotated while being pressed against a photoreceptor made of a polymer material such as organic photoreceptor, it suffers from abrasion scratch or the like, resulting in the deterioration of the photoreceptor. Therefore, the state-of-the-art charging roll has an electrically conductive rubber roller.

As mentioned above, charging members such as charging roll which have heretofore been proposed all have problems in characteristics such as contamination on the photoreceptor, pinhole leak and deterioration due to the attachment of foreign matters or abrasion. Further, these charging members find difficulty in controlling the resistivity variation within the plane. Thus, these prior art charging members leave something to be desired.

SUMMARY OF THE INVENTION

It is therefore an object of the present invention to provide a charging member for charging photoreceptors (preferably, amorphous silicon photoreceptors) which can be supplied with a uniform and stable resistivity, exhibits an excellent durability and is insusceptible to variation of resistivity against environmental conditions, pinhole leak and contamination on the photoreceptors, showing a good quality and a long life.

The foregoing and other objects of the present invention will become more apparent from the following detailed description and examples.

The present invention concerns an electrophotographic charging member for charging a photoreceptor, which comprises a porous anodized aluminum film formed by anodically oxidizing a support the surface of which comprises aluminum or aluminum alloy.

In the charging member of the present invention, it is preferred that the pores in the porous anodized aluminum film be filled with a metal or an electrically conductive material made of an oxyacid salt of transition metal or pure water be attached to the inner wall of the pores in the porous anodized aluminum film.

The charging member of the present invention may comprise a surface protective layer on the porous anodized aluminum film. The surface protective layer preferably comprises an organic high molecular compound or inorganic high molecular compound having electrically conductive fine particles dispersed therein. Alternatively, the surface protective layer may comprise an abrasive dispersed therein.

BRIEF DESCRIPTION OF THE DRAWINGS

By the way of example and to make the description more clear, reference is made to the accompanying drawings in which.

DETAILED DESCRIPTION OF THE INVENTION

The present invention will be further described hereinafter.

Figure 1:
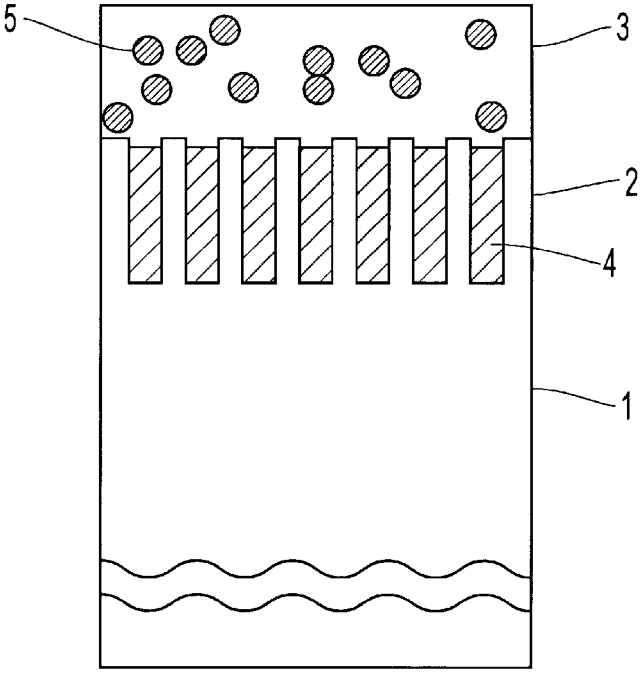
FIG. 1 illustrates a sectional view of a typical example of the charging member of the present invention.
Figure 2:
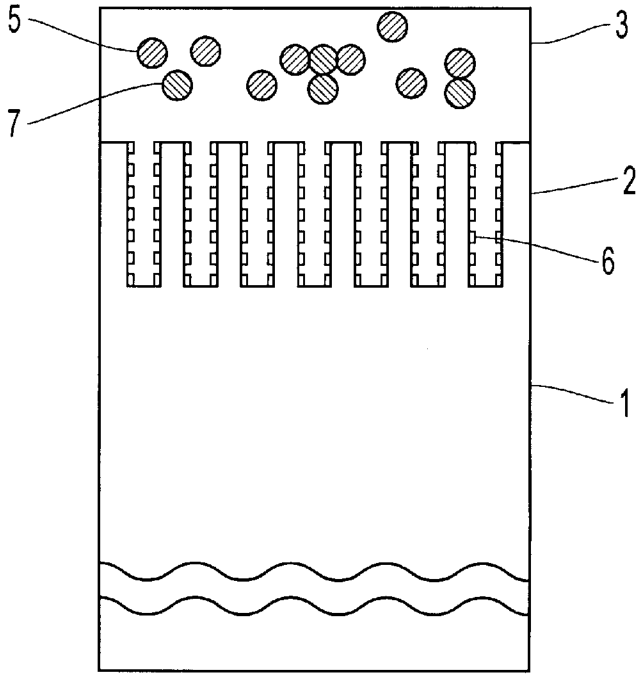
FIG. 2 illustrates a sectional view of another typical example of the charging member of the present invention.

FIGS. 1 and 2 each illustrate a sectional view of a typical example of the charging member of the present invention. In FIGS. 1 and 2, the reference number 1 indicates an aluminum support on which a porous anodized aluminum film 2 is formed. The porous anodized aluminum film 2 has a surface protective layer 3 formed thereon. In FIG. 1, the pores in the porous anodized aluminum film are filled with a deposited metal 4, and the surface protective layer has electrically conductive fine particles 5 dispersed therein. In FIG. 2, an electrically conductive material 6 made of an oxyacid salt of a transition metal is attached to the inner wall of the pores in the porous anodized aluminum film, and the surface protective layer has electrically conductive fine particles 5 and an abrasive 7 dispersed therein.

Figure 3:
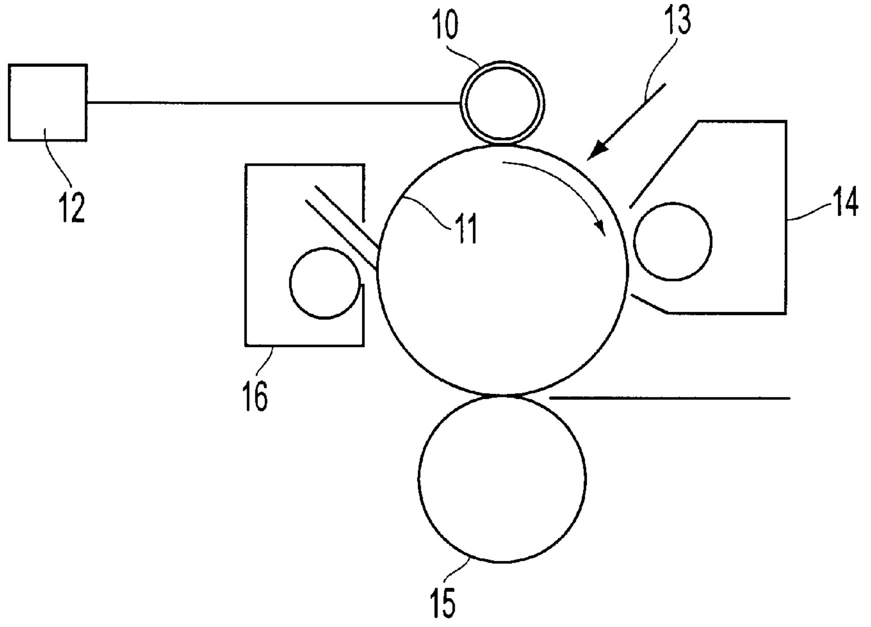
FIG. 3 illustrates a schematic diagram of an electrophotographic apparatus employing an example of the charging member of the present invention.
Figure 4:
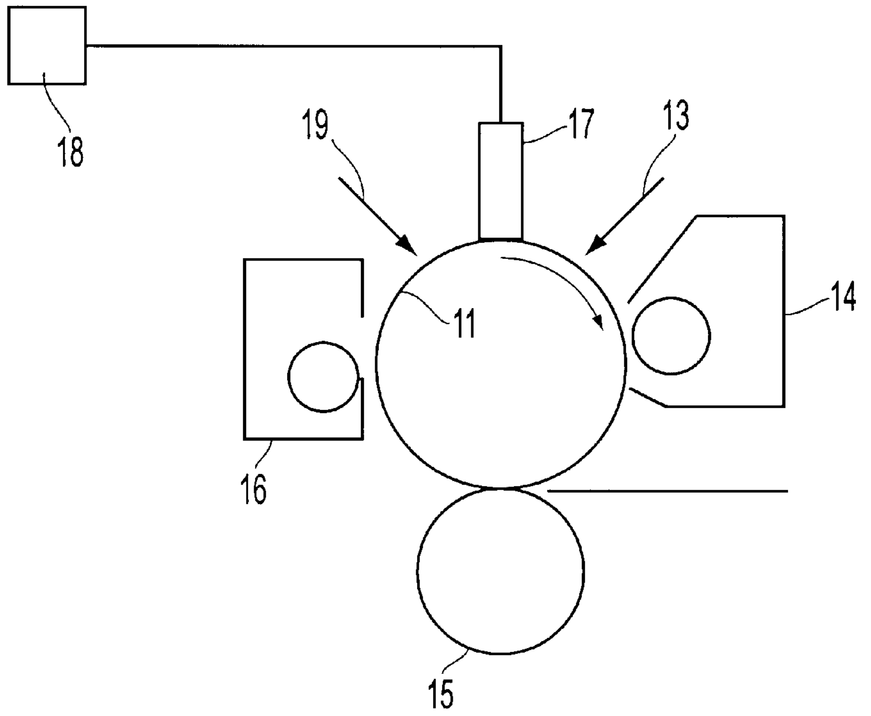
FIG. 4 illustrates a schematic diagram of an electrophotographic apparatus employing another example of the charging member of the present invention, wherein the reference number 1 indicates an aluminum support, the reference number 2 indicates a porous anodized aluminum film, the reference number 3 indicates a surface protective layer, the reference number 4 indicates a metal, the reference number 5 indicates finely divided grains of an electrically conductive material, the reference number 6 indicates an electrically conductive material, the reference number 7 indicates an abrasive, the reference number 10 indicates a charging roll, the reference number 11 indicates a photoreceptor, the reference number 12 indicates a power supply, the reference number 13 indicates a means of exposure, the reference number 14 indicates a means of development, the reference number 15 indicates a means of transfer, the reference number 16 indicates a means of cleaning, the reference number 17 indicates a charging blade, the reference number 18 indicates a power, and the reference number 19 indicates a means of discharging.

FIGS. 3 and 4 each illustrate a schematic diagram of an electrophotographic duplicating machine employing a charging member of the present invention. In FIG. 3, a charging member in the form of charging roll is used. In FIG. 4, a blade type charging member is used. Referring to FIG. 3, a charging roll 10 comes into contact with a drum-shaped photoreceptor 11. A voltage having a DC voltage superimposed on an AC voltage from a power supply 12 is applied to the charging roll so that the surface of the photoreceptor is uniformly charged. A latent image is formed on the surface of the photoreceptor by a means of exposure such as LED (Laser Emitted Diode) and LD (Laser Diode) while being rotated in the direction of the arrow. The latent image is then developed by a means of development 14. The image thus developed is then transferred to a paper by a means of transfer 15 to form an image thereon. The photoreceptor is then cleaned by a means of cleaning 16 to prepare for the subsequent operation. In FIG. 4, a charging blade 17 comes into contact with a drum-shaped photoreceptor 11. A DC voltage from a power supply 18 is applied to the charging blade so that the surface of the photoreceptor is uniformly charged. The reference number 19 indicates a means of discharging. Like remaining numerals refer to similar elements in FIG. 3.

The charging member of the present invention may be in the form of roll or blade. Referring to roll-shaped charging member, a porous anodized aluminum film is formed on a pipe-shaped support having a diameter of 5 to 50 mm. The porous anodized aluminum film is preferably configured such that a metal is deposited to a predetermined height in the pores or an electrically conductive material made of an oxyacid salt of a transition metal or pure water is attached to the inner wall of the pores.

As the support employable in the present invention there may be used a material made of aluminum or aluminum alloy at least in the surface thereof (hereinafter referred to as "aluminum-surfaced support"). In order to obtain an anodized aluminum film having excellent properties, as the aluminum material there may be used pure aluminum as well as aluminum alloy material such as Al-Mg alloy, Al-Mg-Si alloy, Al-Mg-Mn alloy, Al-Mn alloy, Al-Cu-Mg alloy, Al-Cu-Ni alloy, Al-Cu alloy, Al-Si alloy, Al-Cu-Zn alloy, Al-Cu-Si alloy, Al-Mg-Cu-Zn alloy and Al-Mg-Zn alloy. The aluminum material contains aluminum in an amount of 90 wt % or more, preferably 95 wt % or more. These materials may be properly selected. Further, a double-structured material having an aluminum alloy layer on stainless steel can be used.

Further referring to the anodization for forming a porous anodized aluminum film on a support, the support is planished (mirror finished), and then degreased to completely remove oil contents therefrom. Subsequently, the support is anodized to form a porous anodized aluminum film thereon.

The anodization can be carried out as follows. In some detail, an electrolytic solution (anodizing solution) is charged into an electrolytic bath (anodizing bath) made of stainless steel or hard glass to a predetermined liquid level. As the electrolytic solution there is used a 1 to 30 wt. % acidic aqueous solution of an inorganic polybasic acid selected from the group consisting of sulfuric acid, phosphoric acid and chromic acid or an organic monobasic or polybasic acid selected from the group consisting of oxalic acid, malonic acid and tartaric acid. Examples of pure water to be used as a solvent include distilled water and ion-exchanged water. In particular, it is necessary that impurities such as chlorine content be thoroughly removed to inhibit the corrosion or pinholing of the anodized aluminum film and hence obtain a good quality film.

In the electrolyte are then dipped the foregoing aluminum-surfaced support as an anode and a stainless steel plate or aluminum plate as a cathode with a predetermined distance therebetween. The distance between the two electrodes is properly determined to 0.1 to 100 cm. A DC power supply is then prepared. The positive (plus) terminal of the DC power supply is connected to the aluminum-surfaced support while the negative (minus) terminal is connected to the cathode plate. A voltage is then applied across the anode and the cathode in the electrolyte. The electrolysis is normally effected by a constant current process or constant voltage process. The voltage to be applied may consist of DC component or DC component and AC component which are superimposed to one another.

The current density during anodization is predetermined to 0.1 to 10 $A.dm^{-2}$. In the light of rate of film growth and cooling efficiency, it is preferably predetermined to 0.5 to 3.0 $A.dm^{-2}$. The anodizing voltage is normally in the range of 3 to 150 V, preferably 7 to 100 V. The liquid temperature of the electrolyte is predetermined to −5 to 90° C.

In the light of production efficiency, production rate and film properties, one of the most preferred embodiments of the present invention comprises the anodization in a 10 to 20 wt. % aqueous solution of sulfuric acid at a temperature of 5 to 25° C.

The passage of electric current under the foregoing conditions allows the formation of a porous anodized aluminum film on the aluminum surface of the support as the anode.

The porous anodized aluminum film has a rate of pore area (rate of the total pore area per unit area) of 10 to 70%, preferably 20 to 60%, and has an average pore size of 2 to 90 nm, preferably 5 to 50 nm.

The thickness of the porous anodized aluminum film can be controlled by varying the electrolysis time. It is normally predetermined to 1 to 100 μm, preferably 10 to 50 μm. If the film thickness falls below 1 μm, a uniform resistivity can hardly be obtained or pinholes can easily occur. On the contrary, if the film thickness exceeds 100 μm, it raises the production cost and easily produces nonuniformity on the surface of the film. The anodized aluminum film thus formed is then washed with pure water.

Subsequently, a secondary electrolysis is effected so that a metal is deposited in the pores in the porous anodized aluminum film. The electrical conductivity of the metal thus deposited contributes to the control of the resistivity, making the charging member more functional. The metal with which the pores are filled preferably comprises at least one selected from the group consisting of Fe, Ni, Co, Sn, Cu and Zn. In order to electrodepositing these metals, as the electrolyte there is used a solution containing a salt of at least one selected from the group consisting of Fe, Ni, Co, Sn, Cu and Zn and an inorganic or organic ion which serves as a complexing agent with these metals. An AC current or equivalent electric current is used as cathodic current component as viewed from the specimen to effect electrolysis.

As the metal salts to be incorporated in the electrolyte, sulfates such as ferric ammonium sulfate, nickel sulfate, cobalt sulfate, stannous sulfate, copper sulfate and zinc sulfate are economically advantageous. Any metal salts which dissociate into the foregoing metallic ions can be used.

Examples of the inorganic ion-forming substance which serves as a complexing agent with the foregoing metals include boric acid, sulfamic acid, and ammonium sulfate. Examples of the organic ion-forming substance which serves as a complexing agent with the foregoing metals include citric acid, tartaric acid, phthalic acid, malonic acid, and malic acid.

The electric resistivity of the charging member can be controlled by the filling depth of the deposited metal from the bottom of the pore in the porous anodized aluminum film. The filling depth of the deposited metal from the bottom of the pore is in the range of 1/100 to 1/2, preferably 1/50 to 1/2 of the depth of the pore.

The porous anodized aluminum film thus formed is then washed with ion-exchanged water or pure water.

In the case where an electrically conductive material made of an oxyacid salt of a transition metal is used, a support on which a porous anodized aluminum film has been formed may be dipped in an aqueous solution of an oxyacid salt of a transition metal for 1 minute to 10 hours, preferably 5 minutes to 5 hours, optionally followed by the reduction of the attached substance, to allow the electrically conductive material to be attached to the inner wall of the pores.

In the case where pure water is attached to the inner wall of the pores, the support may be dipped in deionized water or pure water for 1 minute to 10 hours, preferably 5 minutes to 5 hours.

As the oxyacid salt of a transition metal to be used to cause an electrically conductive material to be attached to the inner wall of the pores there may be preferably used an oxyacid salt of at least one selected from the group consisting of W, Mo, Cr and Mn. The oxyacid salt may be in the form of hydrogen salt of oxyacid, ammonium salt of oxyacid or alkaline metal salt of oxyacid. The dipping temperature is preferably in the range of 10 to 70° C.

The porous anodized aluminum film to which an electrically conductive material made of an oxyacid salt of a transition metal has been attached is then thoroughly washed with ion-exchanged water or distilled water so that the dipping solution is not brought to the subsequent step. The porous anodized aluminum film may be then optionally dipped in an aqueous solution containing a reducing agent. As the reducing agent there may be used a stannous solution, L-ascorbic acid solution or the like.

Subsequently, a surface protective layer may be formed on the porous anodized aluminum film as necessary. The surface protective layer comprises an organic high molecular compound or inorganic high molecular compound having electrically conductive fine particles or an abrasive dispersed therein.

Examples of the organic high molecular compound in which electrically conductive fine particles are to be dispersed include polyamide resins, polyacrylate resins, polyester resins, phenolic resins, acrylic resins, polyurethane resins, epoxy resins, silicone resins, urethane rubbers, silicone rubbers, NBR (nitrile butadiene rubber), CR (chloroprene rubber), polystyrenes such as SBR (styrene-butadiene rubber), polyisoprene, natural rubber, polybutadiene, EPDM (ethylene-propylene-diene polymer), RB (butadiene resin) and SBS (styrene-butadiene-styrene elastomer), thermoplastic elastomers such as polyolefin, polyester, polyurethane and PVC, polyurethane, polystyrene, PE (polyethylene), PP (polypropyrene), PVC (polyvinyl chloride), styrene-vinyl acetate copolymer, butadiene-acrylonitrile copolymer resin, vinyl acetate emulsion, vinyl acetate latex, acryl emulsion, natural rubber latex, isoprene rubber latex, butadiene rubber latex, and styrene-butadiene rubber latex.

Examples of the inorganic high molecular compound in which electrically conductive fine particles are to be dispersed include glass, silicon oxide, zirconium oxide, titanium oxide and aluminum oxide. The inorganic high molecular compound can be formed by a gas phase method with such as plasma CVD and sputtering, or by coating a hydrolysate of a compound containing a hydrolyzable group such as alkoxy group of organic silicon compounds, organic zirconium compounds, organic titanium compounds and organic aluminum compound, followed by curing.

As the electrically conductive fine particles to be dispersed in the surface protective layer there may be preferably used one having a particle size of not greater than 5 μm and a specific volume resistivity of not greater than $10^9$ Ω.cm. For example, fine particles of a metal oxide such as tin oxide, titanium oxide, zinc oxide, $CeO_2$, $ZrO_2$ and $InO_3$ or alloy thereof, or particulate $BaSO_4$ or $TiO_2$ coated with such a metal oxide, or carbon black may be used. The resistivity control by the electrically conductive fine particles can prevent the resistivity of the surface protective layer from being varied with the environmental conditions to obtain stable properties. The electrically conductive fine particles may be used in an amount of 5 to 95 wt %, preferably 40 to 80 wt % based on the total amount of the surface protective layer. Further, an insulating abrasive such as alumina, silica, clay, kaolin, SiC, $Si_3N_4$, $BaSO_4$, $CaCO_3$, $MgCO_3$ and $FeO_2$ may be incorporated in the surface protective layer to provide the surface of the roll with unevenness and hence reduce the burden developed during friction with the photoreceptor, making it possible to the abrasion resistance of the roll with the photoreceptor. On the contrary, the photoreceptor may be positively worn to inhibit dilation (blurred image). The abrasive may be used in an amount of 5 to 95 wt %, preferably 40 to 80 wt % based on the total amount of the surface protective layer.

The surface protective layer may further comprise fluorinic or siliconic resins or grains incorporated therein to render the surface thereof hydrophobic, preventing foreign matters from being attached to the surface of the roll. Moreover, the surface protective layer may comprise a silicone oil for inhibiting the dilation of the photoreceptor. In order to enhance its adhesivity to the porous anodized aluminum film, the surface protective layer may comprise a coupling agent incorporated therein.

The thickness of the surface protective layer is preferably in the range of 5 to 3,000 μm. The surface protective layer may be constituted of two or three layers.

The surface protective layer can be formed by an ordinary method. For example, a method can be employed which comprises dispersing an electrically conductive material such as metal oxide (e.g., $SnO_2$) and carbon black and an abrasive such as $Al_2O_3$ in a solution of a polyamide resin in a solvent such as methanol to make a coating solution, applying the coating solution to the external surface of the porous anodized aluminum film, and then drying the material.

The conventional charging members comprise a laminate of an electrically conductive rubber layer and a resistive layer formed on a metallic shaft. The electrically conductive rubber layer is used to compensate for the nonuniformity in the contact with the photoreceptor due to the nonuniformity in the molding of the metallic shaft. Since the charging member of the present invention is essentially free of rubber layer, a surface protective layer is preferably formed on the surface of the charging member to compensate for the nonuniformity in the contact with the photoreceptor. The thickness of the protective layer is in the range of 1 to 300 μm, preferably 10 to 150 μm, most preferably 50 to 130 μm. A photoreceptor which can be charged by the charging member according to the present invention may be any of an azo type, phthalocyanine type, squarylium type or perylene type organic photoreceptor and an inorganic photoreceptor such as Se, CdTe, CdSe, a-Si and A-C. Amorphous silicon can be advantageously used as a photoreceptor to enhance the maximum allowable contact pressure against the charging member.

The present invention will be further described in the following examples and comparative examples, but the present invention should not be construed as being limited thereto.

Example 1

A 12-mm diameter aluminum rod made of an Al-Mg alloy was washed with an aqueous solution of a degreasing agent and then with pure water.

As a primary aqueous electrolyte there was prepared an aqueous solution of 150 g of $H_2SO_4$ and 25 g of $Al_2(SO_4)_3$.14 to $18H_2O$ in 1,000 ml of water. A 1.0 A constant DC voltage (10 V) was applied across the aluminum rod and the aluminum cathode for 10 minutes to effect electrolysis. As a result, a porous anodized aluminum film having a thickness of 5 μm was formed.

Example 2

In the same manner as in Example 1, a 12-mm diameter aluminum rod made of an Al-Mg alloy was washed with an aqueous solution of a degreasing agent and then with pure water.

As a primary aqueous electrolyte there was prepared an aqueous solution of 180 g of $H_2SO_4$ and 30 g of $Al_2(SO_4)_3 \cdot 14$ to $18H_2O$ in 1,000 ml of water. A 1.0 constant DC voltage (10 V) was applied across the aluminum rod and the aluminum cathode for 30 minutes to effect electrolysis. As a result, a porous anodized aluminum film having a thickness of 15 μm was formed. Subsequently, the aluminum rod was thoroughly washed with distilled water. The aluminum rod was then subjected to secondary electrolysis with respect to a carbon electrode. In some detail, as a secondary aqueous electrolyte there was prepared an aqueous solution of 60 g of $CoSO_4 \cdot 7H_2O$, 24 g of $H_3BO_3$ and 6 g of $(NH_4)_2SO_4$ in 1,000 ml of water. A 20 V AC voltage was then applied across the two electrodes for 30 minutes. In this manner, Co was deposited in the pores.

50-μm thick surface protective layer was then formed on the porous anodized aluminum film thus treated. The surface protective layer was formed as follows. In some detail, to 45 parts by weight of a copolymer nylon, 55 parts by weight of electrically conductive fine particles having a particle size of 0.5 μm comprising particulate $BaSO_4$ coated with tin oxide (PASTRAN, available from Mitsui Mining & Smelting Co., Ltd.), and 5 parts by weight of an abrasive $Al_2O_3$ was added methanol as a solvent. The mixture was then subjected to dispersion by means of a sand grinder mill for about 1 hour to obtain a resin solution for the formation of a surface protective layer. The resin solution was then viscosity-modified. The resin solution was then charged into a dipping tank as a dipping solution. In the dipping solution was then dipped the aluminum rod so that the aluminum rod was coated with the resin solution. The material was dried at a temperature of 130° C. for 10 minutes, and then desolvented to form a surface protective layer on the porous anodized aluminum film. Thus, a desired charging member was obtained.

Example 3

A charging member was prepared in the same manner as in Example 2 except that instead of depositing a metal by secondary electrolysis, the porous anodized aluminum film was dipped in an aqueous solution of 10 g of $(NH_4)_6 Mo_7O_2.4H_2 O$ in 1,000 ml of water for 20 minutes so that molybdic ions (VI) were attached to the inner wall of the pores in the film.

Example 4

A charging member was prepared in the same manner as in Example 2 except that the charging member thus prepared was dipped in distilled water for 10 minutes, and then dried at room temperature.

Comparative Example 1

A charging member was prepared in the same manner as in Example 1 except that a surface protective layer was directly formed on an aluminum rod in the same manner as in Example 2 without forming an anodized aluminum film thereon.

Comparative Example 2

A charging member was prepared in the same manner as in Example 1 except that the anodized aluminum film was replaced by an electrically conductive elastic layer obtained by uniformly winding an EPDM rubber composition on the aluminum rod and a surface protective layer was formed on the electrically conductive elastic layer in the same manner as in Example 2.

These charging members were each mounted on a electrophotographic printer. An AC voltage having a DC voltage component superimposed thereon was then applied across the charging member while being rotated together with an amorphous silicon photoreceptor drum in contact therewith so that the photoreceptor was charge. In this manner, an image was repeatedly formed. This test was intermittently conducted in an atmosphere of high temperature and high humidity (28° C./80% R.H.) and in an atmosphere of low temperature and low humidity (10° C./15% R.H.). As a result, the use of the charging members of Examples 1 to 4 resulted in the formation of a good quality image even in the 20,000th sheet. In particular, the charging member of Example 4 exhibited a small environmental dependence and provided a predetermined potential and a good quality image at a low current in any environment. While its mechanism is unknown, it is thought that water ion takes part in the phenomenon of charging, enabling the simultaneous occurrence of discharging and injection.

On the contrary, when the charging member of Comparative Example 1 was used, an image defect (black band) due to pinhole leak occurred continuously after several copies. It is thought that the surface protective layer cannot completely cover up metal protrusions and the voltage applied leaks through the metal protrusions to cause shortcircuiting. On the other hand, when the charging member of Comparative Example 2 was used, it provided a normal image in an atmosphere of high temperature and high humidity. In an atmosphere of low temperature and low humidity, however, it provided an image having a low contrast at some portions (particularly at edges). The measurement of the resistivity of the electrically conductive rubber layer showed that the rubber layer has a high resistivity at some portions. This possibly causes the low contrast.

As mentioned above, the charging member of the present invention comprises a porous anodized film formed on the surface of a support. Therefore, no fluctuations of resistivity occur within the plane and from lot to lot during the preparation. The charging member of the present invention can hardly be worn, causing no foregoing matters to be attached to the photoreceptor. Thus, the charging member of the present invention exhibits an excellent durability and a long life. It is also insusceptible to pinhole leak. Further, even if the environmental conditions are altered, the charging member of the present invention exhibits a stable resistivity, causing no contamination on the photoreceptor. Accordingly, the charging member of the present invention can be advantageously used to charge amorphous silicon photoreceptors.

While the invention has been described in detail and with reference to specific embodiments thereof, it will be apparent to one skilled in the art that various changes and modifications can be made therein without departing from the spirit and scope thereof.

What is claimed is:

1. An electrophotographic charging member, which comprises a porous anodized aluminum film formed by anodically oxidizing a support the surface of which comprises aluminum or aluminum alloy and a surface protective layer on the surface of said porous anodized aluminum film, said surface protective layer having dispersed therein electrically conductive fine particles having a particle size of not greater than 5 μm, wherein the pores in said porous anodized aluminum film are filled with (i) a metal, (ii) an electrically conductive material made of an oxyacid salt of transition metal or (iii) pure water attached to the inner walls of the pores.

2. The electrophotographic charging member according to claim 1, wherein said metal (i) comprises at least one selected from the group consisting of Fe, Ni, Co, Sn, Cu and Zn.

3. The electrophotographic charging member according to claim 1, wherein said transition metal comprises at least one selected from the group consisting W, Mo, Cr and Mn.

4. The electrophotographic charging member according to claim 1, wherein said surface protective layer comprises an organic compound selected from the group consisting of polyamide resins, polyacrylate resins, polyester resin, phenolic resins, acrylic resins, polyurethane resins, epoxy resins, silicone resins, urethane rubbers, silicone rubbers, nitrile butadiene rubber, chloroprene rubber, polystyrenes, polyisoprene, natural rubber, polybutadiene, ethylene-propylene-diene polymer, butadiene resin, styrene-butadiene-styrene elastomer, and thermoplastic elastomers or an inorganic compound selected from the group consisting of glass, silicon oxide, zirconium oxide, titanium oxide and aluminum oxide having dispersed therein said electrically conductive fine particles.

5. The electrophotographic charging member according claim 4, wherein said surface protective layer comprises an abrasive dispersed with said electrically conductive particles in said organic compound or in said inorganic compound.

6. The electrophotographic charging member according to claim 1, wherein said porous anodized aluminum film has a rate of pore area of 10to 70%.

7. The electrophotographic charging member according to claim 1, wherein said porous anodized aluminum film has a rate to pore area of 20 to 60%.

8. The electrophotographic charging member according to claim 1, wherein the porous anodized aluminum film has an average pore size of 2 to 90 nm.

9. The electrophotographic charging member according to claim 1, wherein the porous anodized aluminum film has an average pore size of 5 to 50 nm.

10. The electrophotographic charging member according to claim 1, wherein said porous anodized aluminum film is 1 to 100 μm thick.

11. The electrophotographic charging member according to claim 1, wherein said porous anodized aluminum film is 10 to 50 μm thick.

12. An electrophotographic apparatus comprising (A) an electrophotographic charging member according to claim 1 for charging a photoreceptor and (B) a photoreceptor.

13. An electrophotographic charging member, which comprises a porous anodized aluminum film formed by anodically oxidizing a support the surface of which comprises aluminum or aluminum alloy and a surface protective layer on the surface of said porous anodized aluminum film, said surface protective layer having dispersed therein electrically conductive fine particles having a particle size of not greater than 5 μm, wherein said surface protective layer comprises an organic compound selected from the group consisting of polyamide resins, polyacrylate resins, polyester resins, phenolic resins, acrylic resins, polyurethane resins, epoxy resins, silicone resins, urethane rubbers, silicone rubbers, nitrile butadiene rubber, chloroprene rubber, polystyrenes, polyisoprene, natural rubber, polybutadiene, ethylene-propylene-diene polymer, butadiene resin, styrene-butadiene-styrene elastomer, and thermoplastic elastomers or an inorganic compound selected from the group consisting of glass, silicon oxide, zirconium oxide, titanium oxide and aluminum oxide having dispersed therein said electrically conductive fine particles, and wherein said surface protective layer comprises an abrasive dispersed with said electrically conductive particles in said organic compound or in said inorganic compound.

* * * * *